(12) United States Patent
Freitag et al.

(10) Patent No.: US 8,192,867 B2
(45) Date of Patent: Jun. 5, 2012

(54) HYBRID CATHODE DESIGN FOR AN ELECTROCHEMICAL CELL

(75) Inventors: Gary Freitag, East Aurora, NY (US); Dominick Frustaci, Williamsville, NY (US)

(73) Assignee: Greatbatch Ltd., Clarence, NY (US)

( * ) Notice: Subject to any disclaimer, the term of this patent is extended or adjusted under 35 U.S.C. 154(b) by 1026 days.

(21) Appl. No.: 11/865,090

(22) Filed: Oct. 1, 2007

(65) Prior Publication Data

US 2008/0081259 A1    Apr. 3, 2008

Related U.S. Application Data

(60) Provisional application No. 60/827,956, filed on Oct. 3, 2006.

(51) Int. Cl.
*H01M 4/34* (2006.01)
*H01M 4/54* (2006.01)
*H01M 4/583* (2010.01)

(52) U.S. Cl. .................. 429/219; 429/231.5; 429/231.8

(58) Field of Classification Search .................... 429/60, 429/231.7, 231.8
See application file for complete search history.

(56) References Cited

U.S. PATENT DOCUMENTS

| | | | |
|---|---|---|---|
| 3,892,590 A * | 7/1975 | Gunther | ........................ 429/217 |
| 4,310,609 A | 1/1982 | Liang et al. | |
| 5,180,642 A | 1/1993 | Weiss et al. | |
| 5,472,810 A | 12/1995 | Takeuchi et al. | |
| 5,516,340 A | 5/1996 | Takeuchi et al. | |
| 5,744,258 A | 4/1998 | Bai et al. | |
| 6,551,747 B1 | 4/2003 | Gan | |
| 6,936,379 B2 | 8/2005 | Gan et al. | |
| 2007/0077488 A1 * | 4/2007 | Chen et al. | ..................... 429/209 |
| 2008/0038643 A1 * | 2/2008 | Krehl et al. | ..................... 429/322 |

FOREIGN PATENT DOCUMENTS

| | | |
|---|---|---|
| EP | 1207567 A2 | 5/2002 |
| EP | 1326295 A2 | 7/2003 |
| EP | 1207567 A3 | 8/2005 |
| EP | 1326295 A3 | 8/2005 |

OTHER PUBLICATIONS

European search report, dated Mar. 27, 2008.

* cited by examiner

*Primary Examiner* — Basia Ridley
*Assistant Examiner* — James Lee
(74) *Attorney, Agent, or Firm* — Michael F. Scalise

(57) ABSTRACT

An electrochemical cell comprising an anode, a cathode comprised of a first current collector, a first cathode active material having a first energy density and a first rate capability, and a second cathode active material having a second energy density and a second rate capability, and an electrolyte activating the anode and the cathode. The first rate capability of the first cathode active material is greater than the second rate capability of the second cathode active material, and the first energy density of the first cathode active material is greater than or equal to the second energy density of the second cathode active material as a result of the addition of one or more diluents to the second cathode active material. A preferred configuration for the cathode is SVO/current collector/ $CF_x$ with the SVO facing a lithium anode.

17 Claims, No Drawings

HYBRID CATHODE DESIGN FOR AN ELECTROCHEMICAL CELL

CROSS-REFERENCE TO RELATED APPLICATION

This application claims priority from U.S. Provisional Application Ser. No. 60/827,956, filed Oct. 3, 2006.

BACKGROUND OF THE INVENTION

1. Field of the Invention

This invention relates to the conversion of chemical energy to electrical energy. In particular, the present invention relates to a sandwich cathode for an electrochemical cell. The sandwich cathode comprises a first cathode active material mixed with non-active materials including conductive diluents and a binder to provide a first cathode active mixture having a relatively high rate capability in comparison to a second cathode active material mixture. However, the energy density of the first cathode active material mixture is greater than or equal to the second energy density of the second cathode active material mixture. The relative energy densities of the first and second cathode active material mixtures are tailored by the addition of the non-active conductive diluents and binder. In one embodiment, the first and second cathode active material mixtures are contacted to the opposite sides of an intermediate current collector. This cathode design is useful in electrochemical cells that power implantable medical devices requiring a high rate of discharge, stable operation, and predictable end-of-life.

2. Description of Related Art

Improvements in implantable cardiac defibrillators and the electrochemical cells that power them have enabled the use of a single cell to power a defibrillator. However, the requisite cell must have both a high overall energy density and a high rate capability. The capacity of the electrochemical cell is not only dependent on the electrode assembly design and packing efficiency, it also is dependent on the type of active materials used.

Certain patents have disclosed electrodes that provide a cell having both a high overall energy density and a high rate capability. For example, U.S. Pat. No. 5,744,258 to Bai et al. discloses a hybrid electrode for a high power, high energy, electrical storage device. The electrode contains both a high-energy electrode active material and a high-rate electrode active material. The first electrode active material has a higher energy density than the second electrode active material, and the second electrode active material has a higher rate capability than the first electrode active material. The two active materials are deposited on a current collector and the electrode is used to make an energy storage device that exhibits both the high-rate capability of a capacitor and the high energy capability of a battery. The materials can be co-deposited on the current collector in a variety of ways, either in superimposed layers, adjacent layers, intermixed with each other or one material coating the other to form a mixture that is then deposited on the current collector. The disclosure of this patent is incorporated herein by reference.

U.S. Pat. No. 6,551,747 to Gan, which is assigned to the assignee of the present invention and incorporated herein by reference, describes a sandwich cathode design having a first cathode active material of a relatively high energy density but of a relatively low rate capability sandwiched between two current collectors and with a second cathode active material having a relatively low energy density but of a relatively high rate capability in contact with the opposite sides of the current collectors. A preferred low energy density/high rate capability cathode active material is silver vanadium oxide (SVO), and a preferred high energy density/low rate capability active material is fluorinated carbon ($CF_x$). The cathode design is useful for powering an implantable medical device requiring a high rate discharge application.

It is generally recognized that for lithium cells, silver vanadium oxide (SVO) and, in particular, $\epsilon$-phase silver vanadium oxide ($AgV_2O_{5.5}$), is preferred as the cathode active material in high rate cell discharge applications. This active material has a theoretical volumetric capacity of 1.37 Ah/ml. By comparison, the theoretical volumetric capacity of $CF_x$ (x=1.1) is 2.42 Ah/ml, which is 1.77 times that of $\epsilon$-phase silver vanadium oxide. However, for powering a cardiac defibrillator, SVO is preferred because it can deliver high current pulses or high energy within a short period of time. Although $CF_x$ has higher volumetric capacity, it is not useful as the sole cathode active material in medical devices requiring a high rate discharge application. This is due to its low to medium rate of discharge capability. That is one of the reasons the lithium-SVO/$CF_x$ cells disclosed by Gan in U.S. Pat. No. 6,551,747 are advantageous for providing both high energy capacity and high discharge rate in a single device.

Nonetheless, there remains a need for improvement in other aspects of cell performance. This includes the need for an electrochemical cell with the desired energy capacity and discharge rate, but with greater performance stability, reduced voltage delay, reduced cell impedance rise, and greater predictability at end-of-life discharge.

SUMMARY OF THE INVENTION

The present invention fulfils these needs by providing an electrochemical cell comprising an anode, a cathode comprised of a first current collector, a first cathode active material mixture having a first energy density and a first rate capability, and a second cathode active material mixture having a second energy density and a second rate capability, and an electrolyte activating the anode and the cathode. Importantly, the first rate capability of the first cathode active material mixture is greater than the second rate capability of the second cathode active material mixture, and the first energy density of the first cathode active material mixture is greater than or equal to the second energy density of the second cathode active material mixture.

The first cathode active material mixture is comprised of a first active material having a first theoretical energy density combined with a conductive diluent and a binder, and the second cathode active material mixture is comprised of a second active material having a second theoretical energy density combined with a conductive diluent and a binder. The theoretical energy density of the second active material is greater than that of the first active material, but as a result of the addition of the conductive diluent and possible the binder, the energy density of the second cathode active material mixture is less than or equal to the energy density of the first cathode active material mixture. The non-active ingredients comprising the conductive and binder materials are present in an amount greater than ten weight percent and up to about 35 weight percent. In that manner, the energy density of the second active material mixture is modified with non-active ingredients such carbon, or a non-conductive material such as polytetrafluoroethylene. In one preferred embodiment, the first active material is SVO mixed with about 3% graphite and 3% PTFE, by weight, and the second active material is $CF_x$ mixed with carbon and PTFE having a combined weight percent of about 23% or more.

In one embodiment, the cathode active material mixture is then contacted to the first side of a current collector and the second cathode active material mixture is contacted to the second side thereof. In other embodiments, the cathode is provided in a variety of sandwich configurations of the first and second cathode active materials mixture contacted to at least one and possibly two current collectors, as will be described herein.

The foregoing and additional objects, advantages, and characterizing features of the present invention will become increasingly more apparent upon a reading of the following detailed description.

DETAILED DESCRIPTION OF THE PREFERRED EMBODIMENTS

The present invention will be described in connection with preferred embodiments, however, it should be understood that there is no intent to limit the invention to the embodiments described. On the contrary, the intent is to cover all alternatives, modifications, and equivalents as may be included within the scope of the invention as defined by the appended claims.

The electrochemical cell of the present invention is of either a primary or a secondary, rechargeable chemistry, the former being preferred. In order for the cell to possess sufficient energy density and discharge capacity required to meet the rigorous requirements of implantable medical devices, the anode for the primary cell is a thin metal sheet or foil of lithium, pressed or rolled on a metallic anode current collector, i.e., preferably comprising titanium, titanium alloy or nickel. Copper, tungsten and tantalum are also suitable materials for the anode current collector. An alternate anode comprises a lithium alloy for example, Li—Si, Li—Al, Li—B, Li—Mg and Li—Si—B alloys and intermetallic compounds. The greater the amounts of the secondary material present by weight in the alloy, however, the lower the energy density of the cell. The anode current collector has an extended tab or lead contacted by a weld to a cell case of conductive metal in a case-negative electrical configuration. Alternatively, the anode may be formed in some other geometry, such as a bobbin shape, cylinder or pellet, to allow for a low surface cell design.

A cathode of at least two electrically conductive materials serves as the other cell electrode. The cathode is preferably of solid materials and the electrochemical reaction at the cathode involves conversion of ions that migrate from the anode to the cathode into atomic or molecular forms. The solid cathode may comprise a first active material of a metal element, a metal oxide, a mixed metal oxide and a metal sulfide, and combinations thereof and a second active material of a carbonaceous chemistry. The metal oxide, the mixed metal oxide and the metal sulfide of the first cathode active material have a relatively higher rate capability than the second cathode active material.

The first active material is formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII, which includes the noble metals and/or other oxide and sulfide compounds. A preferred first cathode active material is a reaction product of at least silver and vanadium.

One preferred mixed metal oxide is a transition metal oxide having the general formula $SM_xV_2O_y$ where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$ in any one of its many phases, i.e., β-phase silver vanadium oxide having in the general formula x=0.35 and y=5.8, γ-phase silver vanadium oxide having in the general formula x=0.80 and y=5.40 and ε-phase silver vanadium oxide having in the general formula x=1.0 and y=5.5, and combination and mixtures of phases thereof. For a more detailed description of such cathode active materials, reference is made to U.S. Pat. No. 4,310,609 to Liang et al. This patent is assigned to the assignee of the present invention and incorporated herein by reference.

Another preferred composite transition metal oxide cathode material includes $V_2O_z$ wherein z≦5 combined with $Ag_2O$ with silver in either the silver(II), silver(I) or silver(0) oxidation state and CuO with copper in either the copper(II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about 0.01≦z≦6.5. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. No. 5,472,810 to Takeuchi et al. and U.S. Pat No 5,516,340 to Takeuchi et al. These patents are assigned to the assignee of the present invention and incorporated herein by reference.

The cathode further includes a second cathode active material having a relatively low rate capability but higher energy density in comparison to the first cathode active material. One preferred second cathode active material is a carbonaceous compound prepared from carbon and fluorine, which includes graphitic and nongraphitic forms of carbon, such as coke, charcoal or activated carbon. Fluorinated carbon is represented by the formula $(CF_x)_n$ wherein x varies between about 0.1 to 1.9 and preferably between about 0.5 and 1.2, and $(C_2F)_n$ wherein the n refers to the number of monomer units which can vary widely.

Thus, a preferred first cathode active material having a greater rate capability than the second cathode active material is of a mixed metal oxide such as SVO or CSVO. This material is typically provided in a formulation or mixture of, by weight, about 94% SVO and/or CSVO, 3% binder and 3% conductive diluent as the formulation facing the anode. The second active material in contact with the other side of the current collector is, for example, $CF_x$. This material is preferably provided in a second active mixture having less than 90% weight percent $CF_x$, with the remaining constituents being binder and one or more conductive diluents.

Suitable conductive diluents include acetylene black, carbon black and/or graphite. Metals such as nickel, aluminum, titanium and stainless steel in powder form are also useful as conductive diluents.

A suitable binder material is preferably a thermoplastic polymeric material. The term thermoplastic polymeric material is used in its broad sense and any polymeric material which is inert in the cell and which passes through a thermoplastic state, whether or not it finally sets or cures, is included within the term "thermoplastic polymer". Representative binder materials include polyethylene, polypropylene, polyimide, and fluoropolymers such as fluorinated ethylene, fluorinated propylene, polyvinylidene fluoride (PVDF), and polytetrafluoroethylene (PTFE). Natural rubbers are also useful as the binder material with the present invention.

In Table 1 of U.S. Pat. No. 6,551,747, Gan discloses that the theoretical capacity (or theoretical energy density) of $CF_x$ is 2.42 ampere-hours/ml, and the theoretical capacity of $AgV_2O_{5.5}$ is 1.37 Ah/ml. Gan further discloses at column 5, lines 52 to 55 that, "up to about 10 weight percent of a conductive diluent is preferably added to the cathode mixture to improve conductivity," and that even with such a level of dilution, the energy density of $CF_x$ remains greater than that of SVO. By way of Example 1, Gan discloses at column 8, lines 3 to 11:

"An electrochemical cell according to the present invention contained cathode no. 1 having 0.3 grams of a $Ag_2V_4O_{11}$ (SVO) cathode mix consisting of 94% active SVO, 3% of a PTFE binder and 3% of a carbonaceous diluent, by weight, pressed on one side of a cathode current collector (titanium screen, about 4.5 cm$^2$) under 32 tons. The other side of the current collector had 0.2 grams of a $CF_x$ mix containing 91% active $CF_x$, 5% of a PTFE binder and 4% of a carbonaceous diluent pressed thereon under 32 tons."

In Table 2, Gan shows that the "Practical Capacity" (i.e. the actual energy density) of the 94 weight percent $AgV_2O_{5.5}$ is 1.07 Ah/ml, and the practical capacity of the 91 weight percent $CF_x$ is 1.27 Ah/ml. Thus, Gan teaches that even though the second cathode active material is diluted with non-active ingredients of no greater than 10 weight percent, the energy density of the second cathode active material mixture remains greater than the energy density of the first cathode active material mixture. An electrochemical cell containing a cathode design of SVO/current collector/$CF_x$ has the advantage of both the high rate capability of SVO and the high energy density of $CF_x$. However, there remains an opportunity for improvement in other aspects of cell performance.

According to the present invention, dilution of the second cathode active material beyond the 10 weight percent disclosed in the '747 patent of Gan results in a cell with superior performance in comparison to a Li/SVO cell or a LI/$CF_x$ cell. Li/SVO cells lack performance stability over long term discharge; i.e. the performance of Li/SVO cells varies depending on how the cell is discharged. Further, voltage delay occurs during the transition from the first discharge plateau to the second discharge plateau of a typical Li/SVO cell profile, making cell discharge difficult to manage from an end user standpoint. Li/SVO cells also develop increasing irreversible impedance during the second half of their discharge. Finally, determination of the remaining capacity in a Li/SVO cell can be difficult due to the relatively light flat load discharge voltage profile. This makes it difficult for device manufacturers to determine when an implanted device needs to be removed from the body. Li/$CF_x$ cell have acceptable energy density for powering implantable medical devices, but their low to medium rate of discharge capability makes them unacceptable for high pulsatile application such as required for implantable defibrillators, and the like.

According to the present invention, $CF_x$ provided in an active mixture with at least one conductive diluent and possibly a binder in combined amounts greater than about 10 weight percent is effective in improving the discharge characteristics of a Li/SVO cell. By adding diluents in the form of conductive and binder materials to the $CF_x$, some capacity in the cell is sacrificed, but not to a level that renders the cell unsuitable for use as a power source in an implantable medical device. Further, reduction in cell capacity is more than offset by improvements in discharge performance that are attained from the greater degree of active material dilution. Importantly, cell voltage delay is not observed through the middle of cell life, where it typically occurs in Li/SVO cells, and is greatly diminished later in life. The ability to predict the remaining energy capacity within the cell at a given time is also improved.

In one preferred embodiment, $CF_x$ as the second cathode active material is diluted to a concentration of about 74 weight percent, with the total amount of diluents being present at about 26 weight percent. Depending upon the active material and specific diluents, the second cathode active material may be diluted to a concentration as low as about 65 weight percent while still maintaining sufficient energy density. Although both conductive and non-conductive ingredients may be used, a preferred diluent for $CF_x$ is carbon. The use of carbon increases the conductivity of $CF_x$. It is believed that this in turn improves the pulse performance of the cell, especially during the first third of the cell's discharge life.

In addition to silver vanadium oxide and copper silver vanadium oxide (CSVO), the first cathode active material may be comprised of $V_2O_5$, $MnO_2$, $LiCoO_2$, $LiNiO_2$, $LiMn_2O_4$, $TiS_2$, $Cu_2S$, $FeS$, $FeS_2$, copper oxide, copper vanadium oxide, and mixtures thereof. In addition to fluorinated carbon, the second cathode active material may be comprised of $Ag_2O$, $Ag_2O_2$, $CuF_2$, $Ag_2CrO_4$, $MnO_2$, and mixtures thereof.

In a broader sense, however, it is contemplated by the present invention that the first cathode active material may be any material which has a relatively higher rate capability than the second cathode active material. Additionally, the energy density of the first cathode active material is less than the energy density of the second cathode active material. Moreover, as a result of the addition of the at least one conductive diluent and possibly the binder to the second cathode active material, the energy density of the second cathode active material mixture is reduced to a level less than or equal to that of the first cathode active material mixture. In general, dilution of the second cathode active material in an amount greater than ten weight percent is required to achieve the resulting benefit in improved cell performance. Although some discharge capacity is sacrificed, it is small enough that the cell is still suitable for its intended use as a power source for an implantable medical device. The sacrifice of some capacity is worth the benefit gained in cell performance.

A cathode for a cell of the present invention having a first cathode active material mixture and a second cathode active material mixture may be made in a variety of "sandwich" configurations. The cathode current collector is preferably formed as an elongated sheet having a first side and a second side, with the cathode active material mixtures contacted to the opposite sides thereof. The current collector may be formed from stainless steel, titanium, tantalum, platinum, gold, aluminum, cobalt nickel alloys, nickel-containing alloys, highly alloyed ferritic stainless steel containing molybdenum and chromium, and nickel-, chromium-, and molybdenum-containing alloys. In one embodiment, the current collector is titanium having a coating selected from the group consisting of graphite/carbon material, iridium, iridium oxide and platinum provided thereon.

Additionally, the cathode may include two or more current collectors; the overall design is independent of the exact screen or cell stack configuration. Exemplary cathode designs include:

SVO/current collector/CF$_x$, with the SVO facing the anode
CF$_x$/first current collector/SVO, with the CF$_x$ facing the anode
SVO/CF$_x$/current collector/CF$_x$/SVO
SVO/first current collector/CF$_x$/second current collector/SVO
SVO/first current collector/SVO/CF$_x$/SVO/second current collector/SVO
CF$_x$/first current collector/SVO/second current collector/CF$_x$
CF$_x$/first current collector/CF$_x$/SVO/CF$_x$/second current collector/CF$_x$ In embodiments in which the active material mixtures are applied in a cohesive form, i.e. as a solid tape, sheet, or a pellet that is compressed against the current collector, a particular active material may be mixed with a binder such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. (As described previously, more than 10 weight percent diluent is added to the second cathode active material to provide the additional benefits to cell performance.)

In embodiments of the invention in which the active materials are delivered in the form of a paste or slurry applied to the current collector, the slurry is provided by dissolving or dispersing the electrode active material, conductive diluent and binder in a solvent. Suitable solvents include water, methyl ethyl ketone, cyclohexanone, isophorone, N-methyl-2-pyrrolidone (NMP), N,N-dimethylformamide, N,N-dimethylacetamide, toluene, and mixtures thereof.

In order to prevent internal short circuit conditions, the sandwich cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell further includes a nonaqueous, ionically conductive electrolyte which serves as a medium for migration of ions between the anode and the cathode electrodes during electrochemical reactions of the cell. The electrochemical reaction at the electrodes involves conversion of ions in atomic or molecular forms which migrate from the anode to the cathode. Thus, suitable nonaqueous electrolytes are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable lithium salt dissolved in a mixture of aprotic organic solvents comprising a low viscosity solvent and a high permittivity solvent. The inorganic, ionically conductive salt serves as the vehicle for migration of the anode ions to intercalate or react with the cathode active materials. Known lithium salts that are useful as a vehicle for transport of alkali metal ions from the anode to the cathode include $LiPF_6$, $LiBF_4$, $LiAsF_6$, $LiSbF_6$, $LiClO_4$, $LiO2$, $LiAlCl_4$, $LiGaCl_4$, $LiC(SO_2CF_3)_3$, $LiN(SO_2CF_3)_2$, $LiSCN$, $LiO_3SCF_3$, $LiC_6FSO_3$, $LiO_2CCF_3$, $LiSO_6F$, $LiB(C_6H_5)_4$, $LiCF_3SO_3$, and mixtures thereof.

Suitable low viscosity solvents invention include esters, linear and cyclic ethers and dialkyl carbonates such as tetrahydrofuran (THF), methyl acetate (MA), diglyme, triglyme, tetraglyme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof, and suitable high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the present invention, the preferred anode is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

The assembly of the cells described herein may be in the form of a wound element configuration. That is, the fabricated negative electrode, positive electrode and separator may be wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum, aluminum, and niobium, but not limited thereto, so long as the metallic material is compatible for use with the other cell components.

The cell header may be comprised of a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The above assembly describes a case-negative cell, which is the preferred construction of the cells of the present invention. As is well known to those skilled in the art, the present electrochemical cells can also be constructed in a case-positive configuration.

It is, therefore, apparent that there has been provided, in accordance with the present invention, an electrochemical cell including a cathode having first and second cathode active material mixtures of defined rate capability and energy density. While this invention has been described in conjunction with preferred embodiments thereof, it is evident that many alternatives, modifications, and variations will be apparent to those skilled in the art. Accordingly, it is intended to embrace all such alternatives, modifications and variations that fall within the broad scope of the appended claims.

What is claimed is:

1. An electrochemical cell comprising:
a) an anode;
b) a cathode comprised of a first current collector, a first cathode active material mixture having a first energy density and a first rate capability, and a second cathode active material mixture having a second energy density and a second rate capability, wherein the first cathode active material mixture comprises silver vanadium oxide (SVO) mixed with about 3%, by weight, of a conductive diluent and about 3%, by weight, of a first binder and the second cathode active material mixture comprises $CF_x$ mixed with carbon and a second binder, wherein the combined weight percent of carbon and the second binder is 26% up to 35%,
c) wherein the first rate capability of the first cathode active material mixture is greater than the second rate capability of the second cathode active material mixture, and
d) wherein the second energy density of the second cathode active material mixture is less than or equal to, but not greater than, the first energy density of the first cathode active material mixture;
e) a separator positioned between the anode and the cathode to prevent direct physical contact between them by allowing for electrochemical reactions to take place; and
f) an electrolyte activating the anode and the cathode.

2. The electrochemical cell of claim 1 wherein the conductive diluent mixed with SVO is comprised of carbon.

3. The electrochemical cell of claim 1 wherein the first and second binders are comprised of polytetrafluoroethylene.

4. The electrochemical cell of claim 1 wherein the first cathode active material mixture comprises SVO mixed with about 3% graphite as the conductive diluent and about 3% PTFE as the first binder, by weight.

5. The electrochemical cell of claim 1 wherein the first current collector is formed as an elongated sheet having a first side and a second side, and the first cathode active material mixture is contacted to the first side of the current collector and the second cathode active material mixture is contacted to the second side of the current collector.

6. The electrochemical cell of claim 1 wherein the first cathode active material mixture comprising SVO faces the anode of the cell.

7. The electrochemical cell of claim 1 further comprising a second current collector.

8. The electrochemical cell, of claim 7 wherein the first and second current collectors are formed as elongated sheets each having a first side and a second side.

9. The electrochemical cell of claim 8 wherein a first portion of the first cathode active material mixture comprising SVO (SVO mixture) is contacted to the first side of the first current collector, a second portion of the SVO mixture is contacted to the second side of the first current collector, a third portion of the SVO mixture is contacted to the first side of the second current collector, a fourth portion of the SVO mixture is contacted to the second side of the second current collector, and the second cathode active material mixture comprising $CF_x$ is sandwiched between the second portion of the SVO mixture and the third portion of the SVO mixture.

10. The electrochemical cell of claim 1 wherein the cathode has a configuration selected from the group consisting of SVO/current collector/$CF_x$ with the SVO facing the anode, $CF_x$/first current collector/SVO with the $CF_x$ facing the anode, SVO/$CF_x$/current collector/$CF_x$/SVO, SVO/first current collector/$CF_x$/second current collector/SVO, SVO/first current collector/SVO/$CF_x$/SVO/second current collector/SVO, $CF_x$/first current collector/SVO/second current collector/$CF_x$, and $CF_x$/first current collector/$CF_x$/SVO/$CF_x$/second current collector/$CF_x$.

11. An electrochemical cell comprising:
a) a lithium anode;
b) a cathode comprised of a first current collector, a first cathode active material mixture having a first energy density and a first rate capability and a second cathode active material mixture having a second energy density and a second rate capability, wherein silver vanadium oxide (SVO) as a first cathode active material is mixed with about 3% graphite and about 3% PTFE, by weight, to provide the first cathode active material mixture and $CF_x$ as a second cathode active material is mixed with carbon and PTFE having a combined weight percent of 26% up to 35% to provide the second cathode active material mixture so that the first rate capability of the first cathode active material mixture is greater than the second rate capability of the second cathode active material mixture, and the first energy density of the first cathode active material mixture is greater than or equal to, but not less than, the second energy density of the second cathode active material mixture;
c) a separator positioned between the anode and the cathode to prevent direct physical contact between them but allowing for electrochemical reactions to take place; and
d) an electrolyte activating the anode and the cathode.

12. The electrochemical cell of claim 11 wherein the cathode has a configuration selected from the group consisting of SVO/current collector/$CF_x$ with the SVO facing the anode, $CF_x$/first current collector/SVO with the $CF_x$ facing the anode, SVO/$CF_x$/current collector/$CF_x$/SVO, SVO/first current collector/$CF_x$/second current collector/SVO, SVO/first current collector/SVO/$CF_x$/SVO/second current collector/SVO, $CF_x$/first current collector/SVO/second current collector/$CF_x$, and $CF_x$/first current collector/$CF_x$/SVO/$CF_x$/second current collector/$CF_x$.

13. The electrochemical cell of claim 1 wherein the first and second binders are selected from the group consisting of polyethylene, polypropylene, polyimide, fluorinated ethylene, fluorinated propylene, polyvinylidene fluoride (PVDF), polytetrafluoroethylene (PTFE), and natural rubbers.

14. An electrochemical cell comprising:
a) an anode;
b) a cathode comprised of a first current collector, a first cathode active material mixture having a first energy density and a first rate capability, and a second cathode active material mixture having a second energy density and a second rate capability, wherein the first cathode active material mixture comprises silver vanadium oxide (SVO) mixed with up to about 3%, by weight, of a conductive diluent and up to about 3%, by weight, of a first binder and the second cathode active material mixture comprises $CF_x$ mixed with carbon and a second binder, wherein the combined weight percent of carbon and the second binder is 26% up to 35%,
c) wherein the first rate capability of the first cathode active material mixture is greater than the second rate capability of the second cathode active material mixture, and d) wherein the second energy density of the second cathode active material mixture is less than or equal to, but not greater than, the first energy density of the first cathode active material mixture;
e) a separator positioned between the anode and the cathode to prevent direct physical contact between them by allowing for electrochemical reactions to take place; and
f) an electrolyte activating the anode and the cathode.

15. The electrochemical cell of claim 14 wherein the conductive diluent mixed with SVO is comprised of carbon and the first and second binders are selected from the group consisting of polyethylene, polypropylene, polyimide, fluorinated ethylene, fluorinated propylene, polyvinylidene fluoride (PVDF), polytetrafluoroethylene (PTFE), and natural rubbers.

16. An electrochemical cell comprising:
a) an anode;
b) a cathode comprised of a first current collector, silver vanadium oxide (SVO) as a first cathode active material having a first energy density and a first rate capability, and fluorinated carbon ($CF_x$) as a second cathode active material having a second energy density and a second rate capability mixed with 26% up to 35%, by weight, carbon,
c) wherein the first rate capability of the first cathode active material mixture is greater than the second rate capability of the second cathode active material mixture, and
d) wherein the second energy density of the second cathode active material mixture is less than or equal to, but not greater than, the first energy density of the first cathode active material mixture;
e) a separator positioned between the anode and the cathode to prevent direct physical contact between them by allowing for electrochemical reactions to take place; and
f) an electrolyte activating the anode and the cathode.

17. The electrochemical cell of claim 16 wherein the SVO is mixed with about 3%, by weight, of a conductive diluent and about 3%, by weight, of a binder material.

* * * * *